(12) United States Patent
Chen

(10) Patent No.: US 6,435,318 B1
(45) Date of Patent: Aug. 20, 2002

(54) TWO-STAGE BICYCLE DISK BRAKE ASSEMBLY WITH AN ANTI-LOCK DEVICE

(75) Inventor: I-Der Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 09/850,446

(22) Filed: May 7, 2001

(51) Int. Cl.[7] ............... B60L 3/00; B60T 11/00
(52) U.S. Cl. ................... 188/24.22; 188/344
(58) Field of Search ............. 188/24.22, 24.11, 188/344, 73.1; 303/DIG. 11

(56) References Cited

U.S. PATENT DOCUMENTS

| | | | | |
|---|---|---|---|---|
| 5,632,362 A | * | 5/1997 | Leitner | 188/24.22 |
| 5,950,772 A | * | 9/1999 | Buckley et al. | 188/24.22 |
| 6,119,818 A | * | 9/2000 | Krumbeck et al. | 188/24.22 |
| 6,341,673 B1 | * | 1/2002 | Kuo | 188/24.22 |

* cited by examiner

Primary Examiner—Christopher P. Schwartz
Assistant Examiner—Robert A. Siconolfi
(74) Attorney, Agent, or Firm—Harness, Dickey & Pierce, P.L.C.

(57) ABSTRACT

A bicycle disk brake assembly includes a pressure-reducing cylinder attached to a caliper body and formed with an inner chamber and outer chamber. Upon application of an external pressure to a hydraulic fluid, which is filled within a fluid reservoir in the caliper body, the fluid flows from the reservoir to the outer chamber. When the fluid pressure in the outer chamber reaches a first value, an inner check valve is operated so as to permit flow of the fluid from the outer chamber to the inner chamber. Thereafter, when the fluid pressure in the inner chamber reaches a second value and when the external pressure is released, a resilient member biases the fluid in the inner chamber to activate an outer check valve, thereby permitting flow of the fluid from the inner chamber to the outer chamber and subsequently to the reservoir.

3 Claims, 4 Drawing Sheets

TWO-STAGE BICYCLE DISK BRAKE ASSEMBLY WITH AN ANTI-LOCK DEVICE

BACKGROUND OF THE INVENTION

1. Field of the Invention

This invention relates to a bicycle brake, more particularly to a two-stage bicycle disk brake assembly with an anti-lock device, which can prevent instant braking of a bicycle wheel.

2. Description of the Related Art

Referring to FIG. 1, a conventional bicycle disk brake assembly is shown to include a caliper body 1 and two brake pads 103. The caliper body 1 is adapted to be mounted on a fork of a bicycle (not shown), and has a vertical passage 102 adapted to permit extension of a brake disk 2 of the wheel of the bicycle (not shown) therein, and a fluid reservoir 101 replete with a hydraulic fluid. When an external pressure is applied on the fluid in the fluid reservoir 101 by virtue of actuation of a brake lever of the bicycle (not shown), the brake pads 103 will move toward each other so as to clamp and lock the disk 2 therebetween, thereby braking the wheel (not shown). The aforesaid conventional brake assembly suffers from a drawback in that in a case where the speed of the bicycle is relatively high, when the bicycle is braked urgently, the action of the pads 103 on the disk 2 will result in skidding of the wheel on the road or overturning of the bicycle.

SUMMARY OF THE INVENTION

An object of this invention is to provide a two-stage bicycle disk brake assembly with an anti-lock device so as to prevent the occurrence of the above-stated drawback.

According to this invention, a bicycle disk brake assembly includes a pressure-reducing cylinder attached to a caliper body and formed with an inner chamber and outer chamber. Upon application of an external pressure to a hydraulic fluid, which is filled within a fluid reservoir in the caliper body, the fluid flows from the reservoir to the outer chamber. When the fluid pressure in the outer chamber reaches a first value, an inner check valve is operated so as to permit flow of the fluid from the outer chamber to the inner chamber. Thereafter, when the fluid pressure in the inner chamber reaches a second value and when the external pressure is released, a resilient member biases the fluid in the inner chamber to activate an outer check valve, thereby permitting flow of the fluid from the inner chamber to the outer chamber and subsequently to the reservoir.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
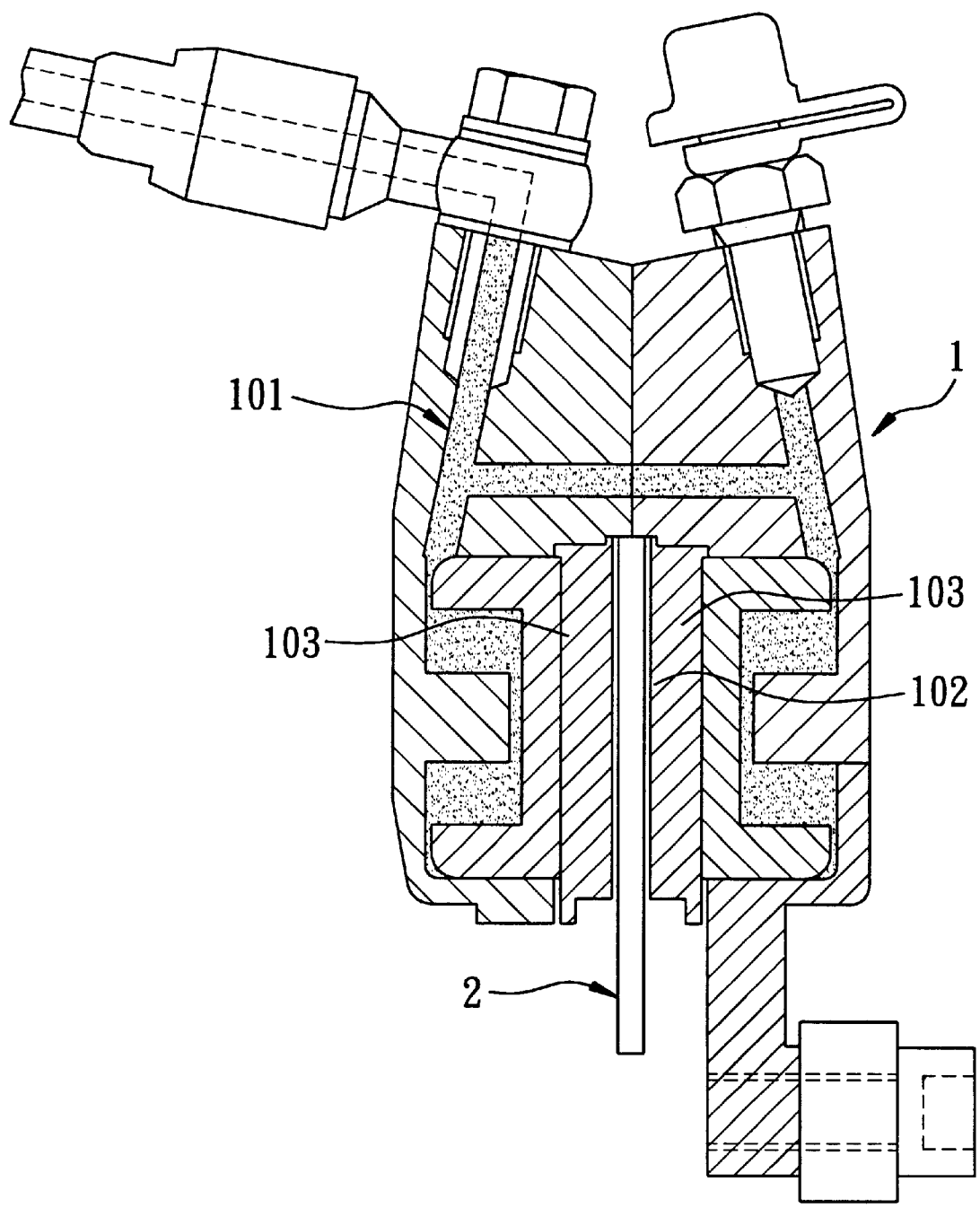
FIG. 1 is a schematic sectional view of a conventional bicycle disk brake assembly.
Figure 2:
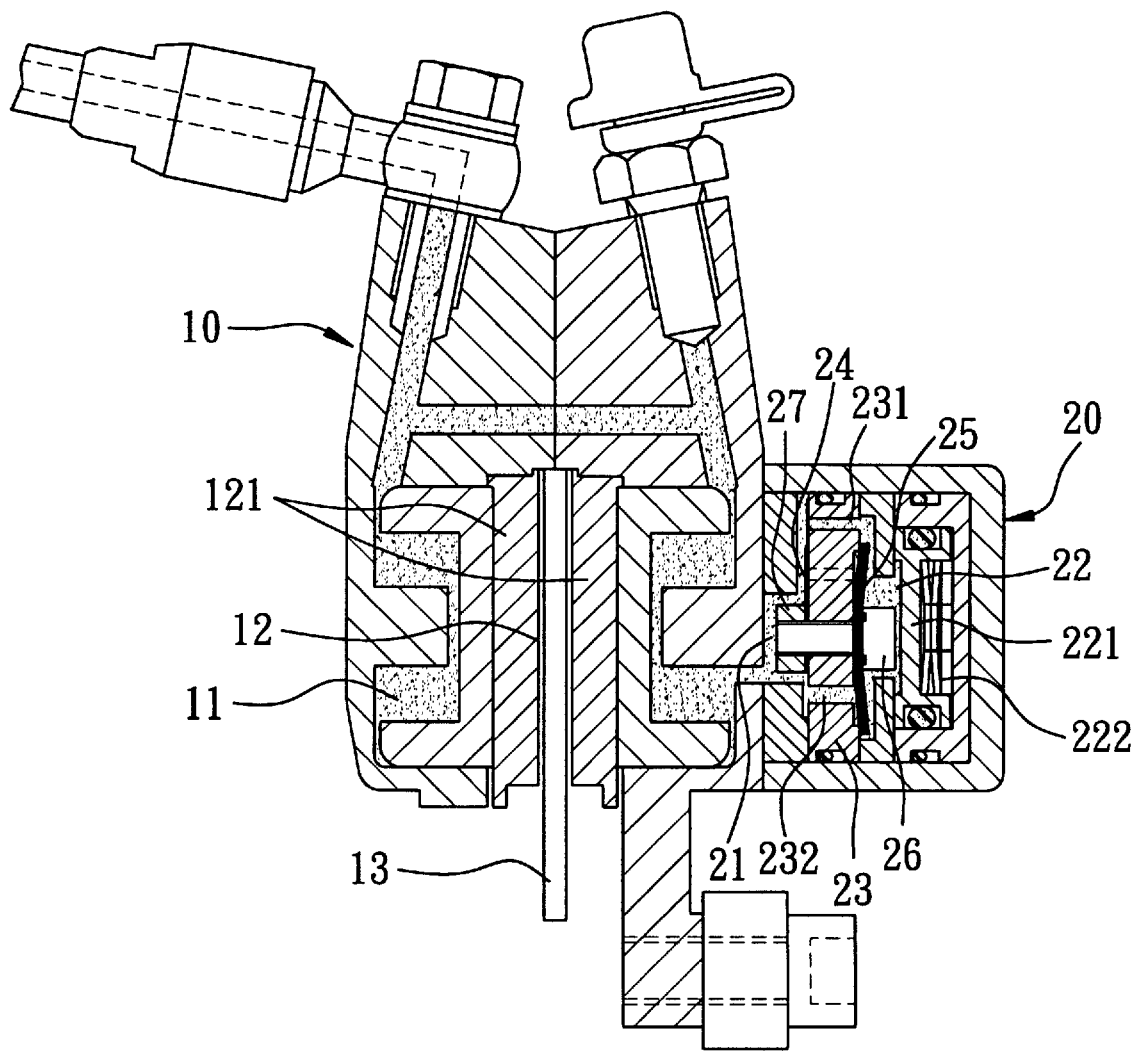
FIG. 2 is a schematic sectional view of the preferred embodiment of a two-stage bicycle disk brake assembly, which is installed on a bicycle wheel.

Referring to FIG. 2, the preferred embodiment of a two-stage bicycle disk brake assembly according to this invention is shown to include a caliper body 10 and a pressure-reducing cylinder 20 that is attached fixedly to the caliper body 10.

The caliper body 10 is fixed on a fork of a bicycle (not shown), and has a fluid reservoir 11 replete with a hydraulic fluid, and a vertical passage 12 for extension of a disk 13 of a bicycle wheel (not shown) therein. In the vertical passage 12, two brake pads 121 are disposed on two sides of the disk 13 in a known manner. When an external pressure is applied on the fluid in the reservoir 11, the pads 121 move toward each other so as to clamp and lock the disk 13 therebetween, thereby braking the bicycle wheel.

Figure 3:
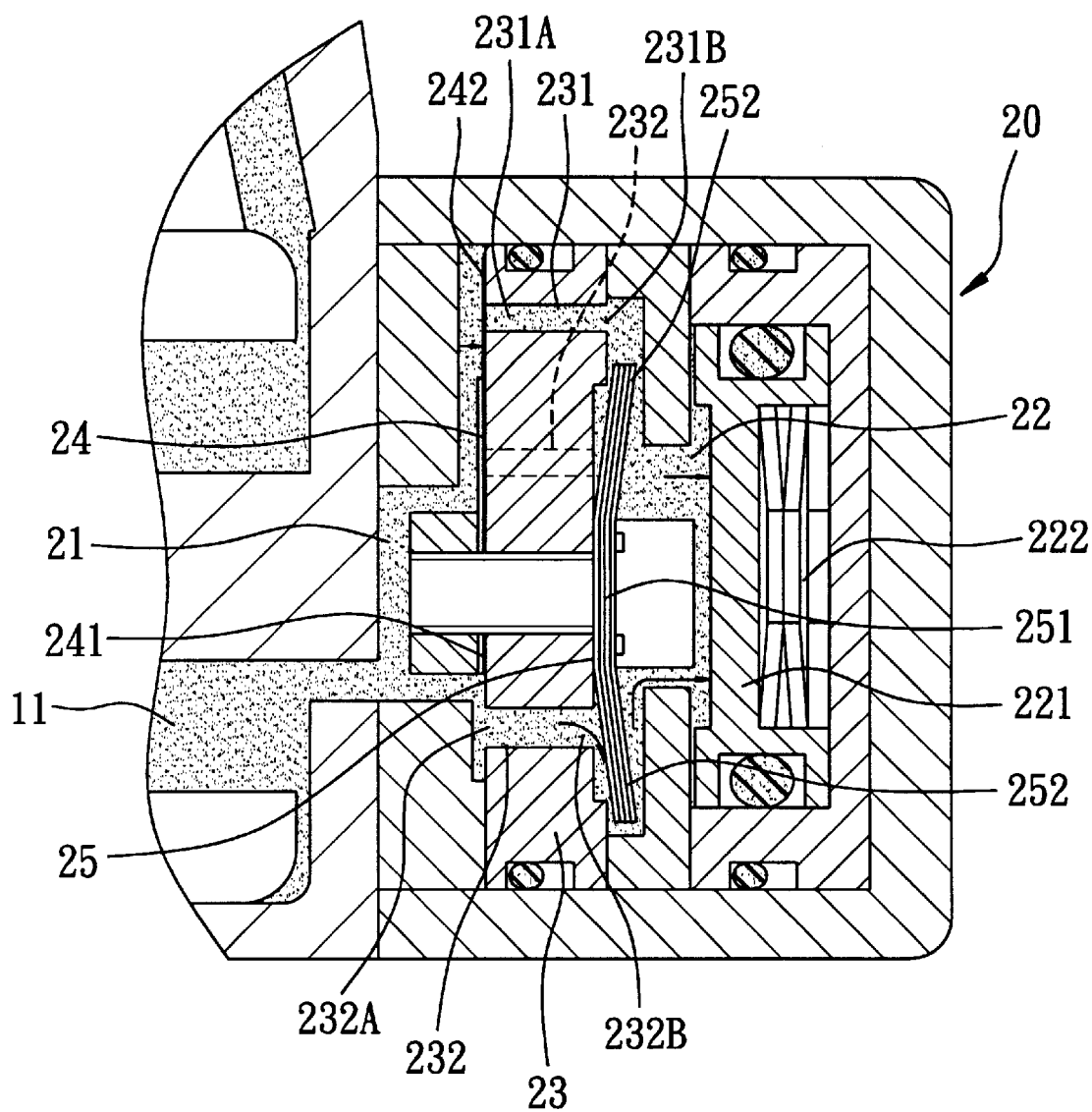
FIG. 3 is a schematic fragmentary sectional view of the preferred embodiment, illustrating the operation of a pressure-reducing cylinder of the preferred embodiment when the bicycle wheel is braked urgently.
Figure 4:
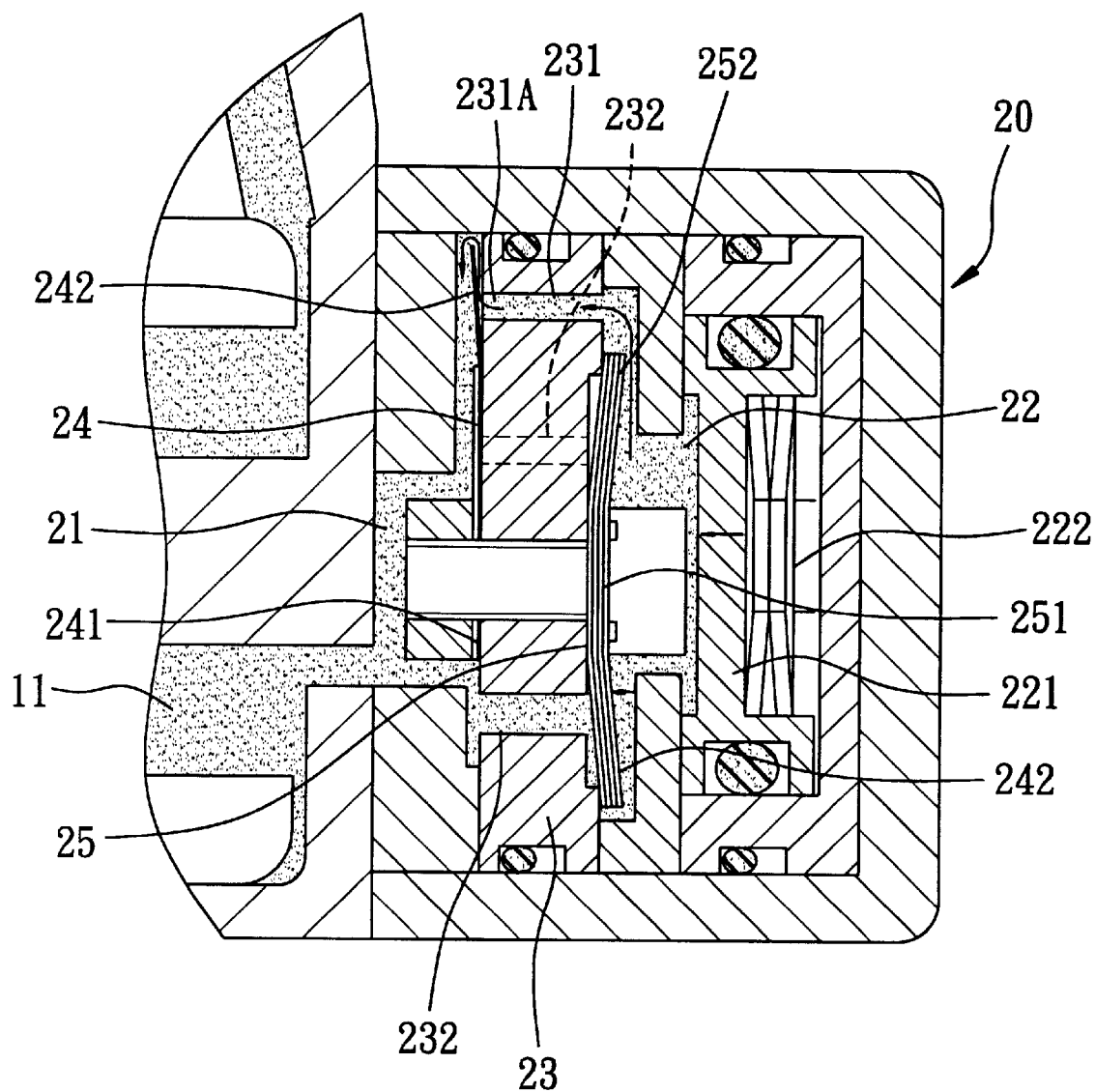
FIG. 4 is a schematic fragmentary sectional view of the preferred embodiment, illustrating how the pressure-reducing cylinder returns to its normal state at the end of an urgent braking action.

The cylinder 20 includes an outer chamber 21 that is in fluid communication with the reservoir 11, an inner chamber 22, and a partition 23 that is fixed in the cylinder 20 between the outer and inner chambers 21, 22. The partition 23 has an outflow passage 231 and three inflow passages 232 (only two are shown in FIG. 3). Each of the outflow passage 231 and the inflow passages 232 has an outer end (231A, 232A) that is in fluid communication with the outer chamber 21, and an inner end (231B, 232B) that is in fluid communication with the inner chamber 22. An outer check valve 24 and an inner check valve 25 have two opposed mounting portions 241, 251 fastened respectively to two opposite side surfaces of the partition 23 by means of a bolt 26 and a nut 27, and are constructed as disk springs. A sealing portion 242 of the outer check valve 24 is biased to close the outer end (231A) of the outflow passage 231, while three peripheral sealing portions 252 of the inner check valve 25 are biased to close the inner ends (232B) of the inflow passages 232.

Referring to FIG. 3, when it is desired to brake urgently the bicycle, a brake lever (not shown) is actuated so as to apply an external force on the fluid in the reservoir 11 in a known manner, thereby permitting flow of the fluid from the reservoir 11 to the outer chamber 21. As soon as the fluid pressure in the outer chamber 21 reaches a first predetermined value that can overcome the spring force of the inner check valve 25, the fluid removes the sealing portions 252 of the inner check valve 25 from the inner ends (232B) of the inflow passages 232 so as to permit the fluid to flow from the outer chamber 21 to the inner chamber 22 via the inflow passages 232, thereby moving a piston 221 inwardly in the inner chamber 22 and compressing a resilient member 222, which is shaped as a coiled compression spring. At this time, because the fluid pressure in the outer chamber 21 is larger than that in the inner chamber 22, the outer check valve 24 closes the outer end (231A) of the outflow passage 231. As such, the wheel is prevented from instant braking.

Thereafter, when the brake lever (not shown) is released, the resilient member 222 stretches so that the piston 221 compresses the fluid in the inner chamber 22 until the fluid pressure in the inner chamber 22 reaches a second predetermined value that can overcome the spring force of the outer check valve 24, thereby removing the sealing portion 242 of the outer check valve 24 from the outer end (231A) of the outflow passage 231. Consequently, the fluid flows from the inner chamber 22 to the reservoir 11 via the outflow passage 231 and the outer chamber 21.

With this invention thus explained, it is apparent that numerous modifications and variations can be made without departing the scope and spirit of this invention. It is therefore intended that this invention be limited only as indicated by the appended claims.

I claim:

1. A bicycle disk brake assembly adapted to be mounted on a fork of a bicycle for braking a brake disk of a wheel, said bicycle disk brake assembly comprising:

a caliper body adapted to be attached fixedly to the fork and having a vertical passage adapted to permit extension of the brake disk of the wheel therein, and a fluid reservoir replete with a hydraulic fluid;

two brake pads mounted within said vertical passage in said caliper body and operably associated with said reservoir in such a manner that when an external pressure is applied on the fluid in said reservoir, said brake pads will move toward each other; and a pressure-reducing cylinder including an outer chamber in fluid communication with said reservoir in said caliper body, an inner chamber, a partition fixed in said cylinder between said inner and outer chambers and having an inflow passage and an outflow passage, which are formed therethrough, each of said inflow and outflow passages having an inner end that is in fluid communication with said inner chamber, and an outer end that is in fluid communication with said outer chamber, an inner check valve for limiting flow of the fluid from said outer chamber to said inner chamber, said inner check valve being biased to close said inner end of said inflow passage when the fluid pressure in said outer chamber is smaller than a first predetermined value and being activated to open said inner end of said inflow passage when the fluid pressure in said outer chamber reaches the first predetermined value, an outer check valve for limiting flow of the fluid from said inner chamber to said outer chamber, said outer check valve being biased to close said outer end of said outflow passage when the fluid pressure in said inner chamber is smaller than a second predetermined value, said outer end of said outflow passage being opened when the fluid pressure in said inner chamber reaches the second predetermined value, a piston disposed movably and sealingly within said inner chamber and movable inward within said inner chamber when the fluid flows from said outer chamber to said inner chamber, and a resilient member for urging said piston outwardly so as to bias the fluid to flow from said inner chamber to said outer chamber and subsequently to said reservoir when the fluid pressure in said inner chamber reaches the second predetermined value and when the external pressure is released from the fluid in said reservoir.

2. The bicycle disk brake assembly as claimed in claim 1, wherein said resilient member is a coiled compression spring, which can be compressed when the fluid flows from said outer chamber to said inner chamber so as to create a restoration force that biases the fluid to flow from said inner chamber to said outer chamber when the fluid pressure in said inner chamber reaches the second predetermined value and when the external pressure is released from the fluid in said reservoir.

3. The bicycle disk brake assembly as claimed in claim 1, wherein said inner and outer check valves are constructed as disk springs, which are fastened to two opposite sides of said partition.

* * * * *